(12) United States Patent
Okamura et al.

(10) Patent No.: US 9,195,118 B2
(45) Date of Patent: Nov. 24, 2015

(54) CAMERA APPARATUS

(71) Applicant: PANASONIC CORPORATION, Osaka (JP)

(72) Inventors: Shinichiro Okamura, Fukuoka (JP); Hiroki Yamanaka, Fukuoka (JP); Tamotsu Uchida, Fukuoka (JP); Masami Asanuma, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 82 days.

(21) Appl. No.: 14/231,801

(22) Filed: Apr. 1, 2014

(65) Prior Publication Data
US 2014/0301729 A1 Oct. 9, 2014

(30) Foreign Application Priority Data

Apr. 5, 2013 (JP) .................................. 2013-079609

(51) Int. Cl.
*G03B 15/06* (2006.01)
*G03B 15/16* (2006.01)
*H04N 5/225* (2006.01)
*H04N 5/232* (2006.01)

(52) U.S. Cl.
CPC .............. *G03B 15/16* (2013.01); *H04N 5/2252* (2013.01); *H04N 5/232* (2013.01); *H04N 5/23206* (2013.01)

(58) Field of Classification Search
CPC ............... G03B 17/00; G08B 13/1963; G08B 13/19619; G08B 13/19632; G08B 13/1956; G08B 13/19643; H04N 7/181; H04N 7/183; H04N 7/18

USPC .......... 396/427, 419, 7, 133; 348/143, 36, 37
See application file for complete search history.

(56) References Cited

U.S. PATENT DOCUMENTS

| 6,705,774 | B2 | 3/2004 | Tashiro et al. |
|---|---|---|---|
| 2002/0085844 | A1 | 7/2002 | Tashiro et al. |
| 2008/0211913 | A1 | 9/2008 | Togawa |
| 2009/0080878 | A1 | 3/2009 | Cirker |
| 2011/0033179 | A1* | 2/2011 | Sasaki ........................... 396/427 |
| 2011/0103786 | A1* | 5/2011 | Cirker ........................... 396/427 |
| 2012/0098927 | A1 | 4/2012 | Sablak |

FOREIGN PATENT DOCUMENTS

| JP | 2002-232767 | 8/2002 |
|---|---|---|
| JP | 2005-175758 | 6/2005 |

(Continued)

OTHER PUBLICATIONS

International Search Report and Written Opinion in PCT/JP2014/057018, mail date is Jul. 18, 2014.

(Continued)

*Primary Examiner* — Rochelle-Ann J Blackman
(74) *Attorney, Agent, or Firm* — Greenblum & Bernstein, P.L.C.

(57) ABSTRACT

A camera apparatus includes a camera unit that is provided with a camera lens, a camera body that rotatably holds the camera unit, and a rotating mechanism that rotates the camera unit in response to an emergency signal so as to be switched from a first state where the camera lens is stored inside the camera body to a second state where the camera lens is exposed to an outside of the camera body.

15 Claims, 16 Drawing Sheets

(56) References Cited

FOREIGN PATENT DOCUMENTS

| | | |
|---|---|---|
| WO | 2008/091034 | 7/2008 |
| WO | 2009/039385 | 3/2009 |
| WO | 2011/002775 | 1/2011 |

OTHER PUBLICATIONS

Paritial International Search report in PCT/JP2014/057018, mail date is May 14, 2014.

* cited by examiner

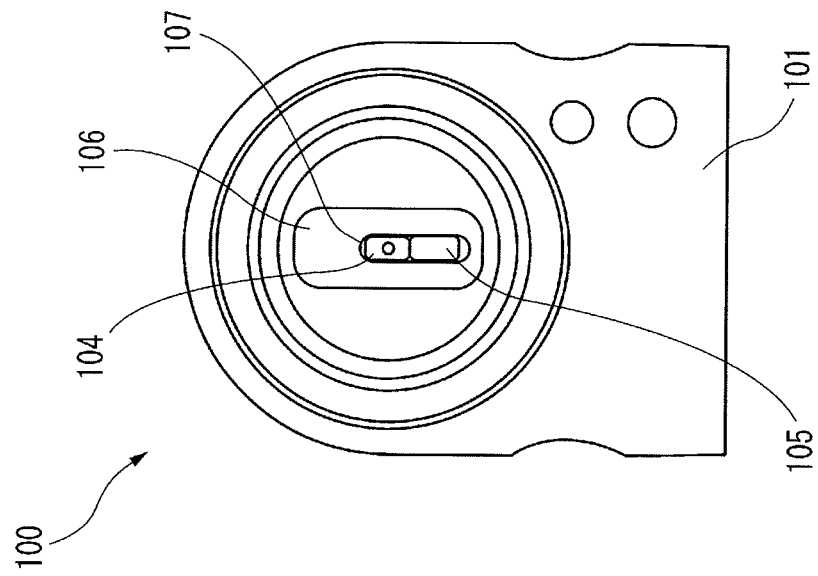
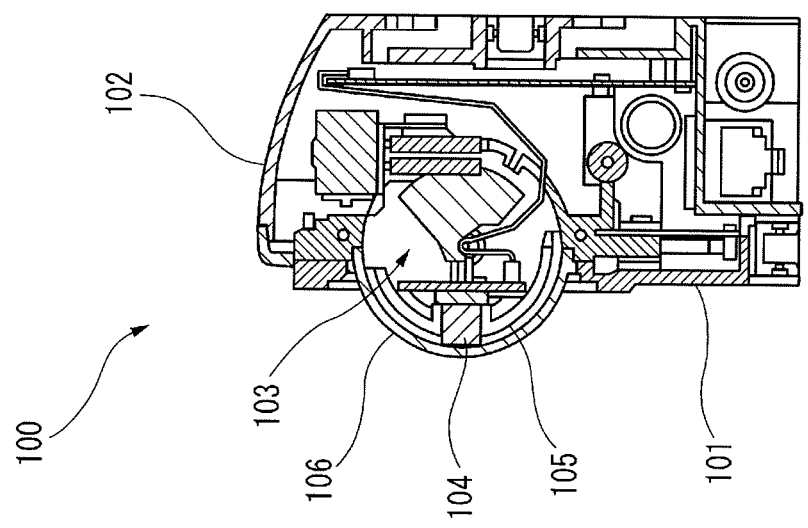

CAMERA APPARATUS

BACKGROUND

1. Field of the Invention

The present invention relates to a camera apparatus that is attached to a surface such as a ceiling and that captures images in some regions or surroundings thereof.

2. Description of the Related Art

There is a known camera apparatus that captures images in surroundings and performs monitoring or observing (For example, refer to JP-A-2005-175758). As illustrated in FIGS. 16A and 16B, JP-A-2005-175758 discloses a network camera (camera apparatus) 100 having a front cabinet 101 and a back cabinet 102. The front cabinet 101 serves as a front surface side casing of a body, and the back cabinet 102 fits into the front cabinet 101.

A camera unit 103 is accommodated in an inner space formed by the front cabinet 101 and the back cabinet 102. The camera unit 103 has a lens 104, a lens holder 105 and a cover 106. The cover 106 has an opening portion 107, and incident light from outside passes through the opening portion 107 to be incident on the lens 104. In a normal imaging mode, the lens 104 moves in a tilt direction within a range where the incident light from the outside can be incident directly on the lens 104 through the opening portion 107 of the cover 106.

Moreover, when not in the imaging mode, the lens 104 is movable to a position where the incident light from the outside cannot be incident directly thereon, that is, where the lens 104 is covered by a part other than the opening portion 107 of the cover 106. In this state, the lens 104 is hidden behind the cover 106, and thus, it is possible to easily and visually recognize that the camera unit 103 is not in the imaging position. Accordingly, a person can be prevented from feeling uneasy about whether being imaged although not imaged.

SUMMARY

However, in a camera apparatus (network camera 100) in the related art, there is a need for a plate member (cover 106) to hide the lens 104, thereby causing an increase in the number of components of the camera apparatus.

In addition, since the lens 104 faces upward when not performing imaging, it is not possible to perform monitoring by imaging obliquely upward. Therefore, there is a demand for improvement.

A non-limited object is to provide a camera apparatus that hides a lens when in a non-imaging mode without providing an additional component.

In an aspect of the present disclosure, a camera apparatus includes: a camera unit that is provided with a camera lens; a camera body that rotatably holds the camera unit; and a rotating mechanism that rotates the camera unit in response to an emergency signal so as to be switched from a first state where the camera lens is stored inside the camera body to a second state where the camera lens is exposed to an outside of the camera body.

In a camera apparatus according to the present disclosure, a camera lens is configured to be rotatable and the camera lens rotates from an imaging position to a non-imaging position that cannot be seen from an imaging target region. Therefore, when the camera lens is in a state of being rotated to the non-imaging position, the camera lens cannot be seen from the imaging target region. Therefore, according to the camera apparatus of the present disclosure, there is no need for a member to hide the camera lens to be provided, and it is possible to make a person visually recognize that he/she is not imaged by the camera unit.

BRIEF DESCRIPTION OF THE DRAWINGS

In accompanying drawings:

FIG. 16A is a cross-sectional side view of a network camera at imaging in a related art; and FIG. 16B is a front view of the network camera in the related art.

DETAILED DESCRIPTION

Hereinafter, an embodiment of a camera apparatus will be described with reference to the accompanying drawings.

Figure 1:
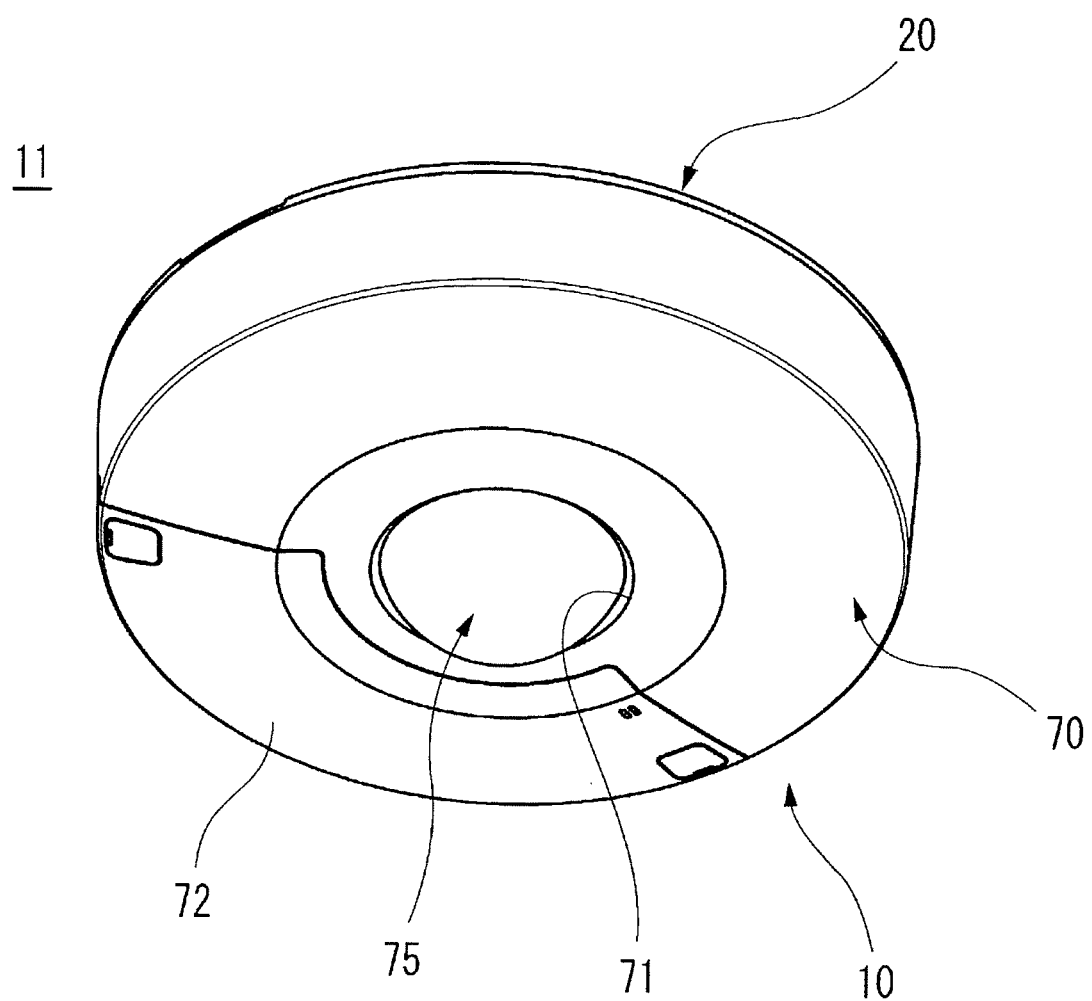
FIG. 1 is a perspective view illustrating an in-use state of a camera apparatus according to the present embodiment.

As illustrated in FIG. 1, a camera apparatus 10 according to the present embodiment is attached, for example, to a ceiling surface 11 which is a portion to be attached facing downward. The camera apparatus 10 is used as a monitoring camera which captures images in surroundings mainly on a lower side. The camera apparatus 10 has a camera body (hereinafter, referred to as "body") 20 which is attached to the ceiling surface 11, and a cover (casing) 70 which covers the front of the body 20 in an imaging direction (in FIG. 1, below), and a substantially hemispherical-shaped transparent dome cover 75.

In the description below, directional terms "up" and "down" indicate "above" and "below" on a sheet where the referenced drawing is illustrated. Particularly, when indicating "above or upward" and "below or downward" in an in-use state of the camera apparatus 10 (that is, imaging direction), the state will be mentioned.

Figure 2A:
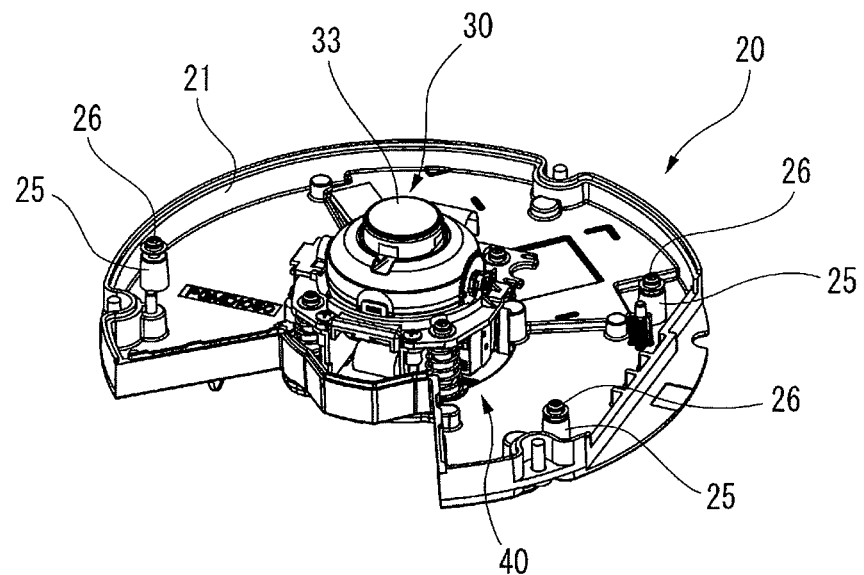
FIG. 2A is a perspective view of a body in which a camera unit and a holding mechanism are mounted.

As illustrated in FIG. 2A, the body 20 is a plate-like member in a fan shape and has a standing wall 21 on an outer peripheral edge. Here, the body 20 is in the fan shape with a central angle of approximately 270 degrees, for example. In addition, a camera unit 30 is rotatably attached to the center of the body 20.

Figure 2B:
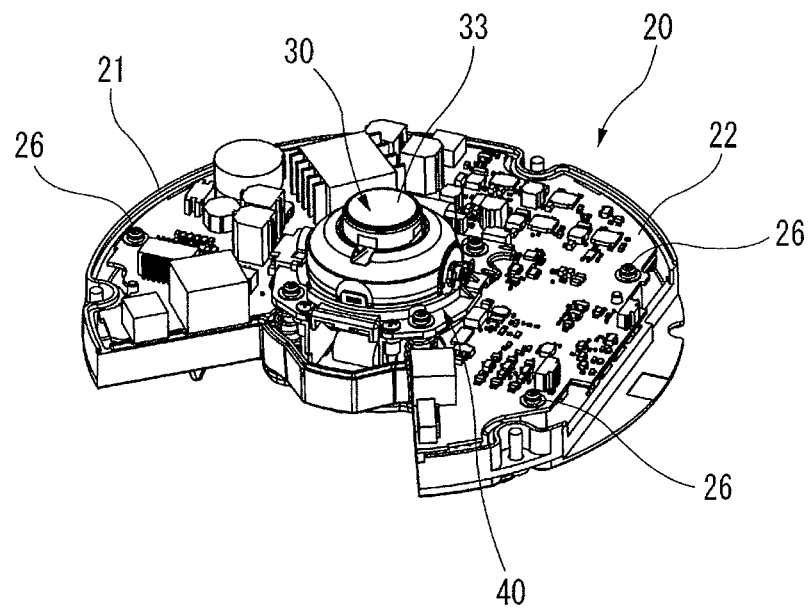
FIG. 2B is a perspective view of the body in which the camera unit, the holding mechanism and a circuit board are mounted.

As illustrated in FIG. 2B, a circuit board 22 on which various electronic components are mounted is attached to the surroundings of the camera unit 30. The circuit board 22 is attached to an attachment base 25 provided on an upper surface of the body 20 by screws 26.

As illustrated in FIG. 1, a fan-shaped cover 70 corresponding to the shape of the body 20 is attached to the body 20. A circular opening 71 is provided in the center portion of the cover 70 (main portion in fan shape), and the dome cover 75 is attached so as to cover the opening 71. The camera unit 30 is held in a state of being stored inside the cover 70 (first state), or a state of being exposed to the outside of the cover 70 (second state). When in the state of being exposed to the outside of the cover 70, that is, when in the second state, the camera unit 30 can perform imaging the outside of the body 20 over the dome cover 75. The cover 70 is formed of a resin, and the color of an outer surface of the cover 70 is white, for example.

In addition, a fan-shaped auxiliary cover 72 which configures a circle shape together with the fan-shaped cover 70 is attached to the body 20. The auxiliary cover 72 is formed of the resin, and the color of an outer surface of the auxiliary cover 72 is the same (white, for example) as the cover 70.

Figure 3:
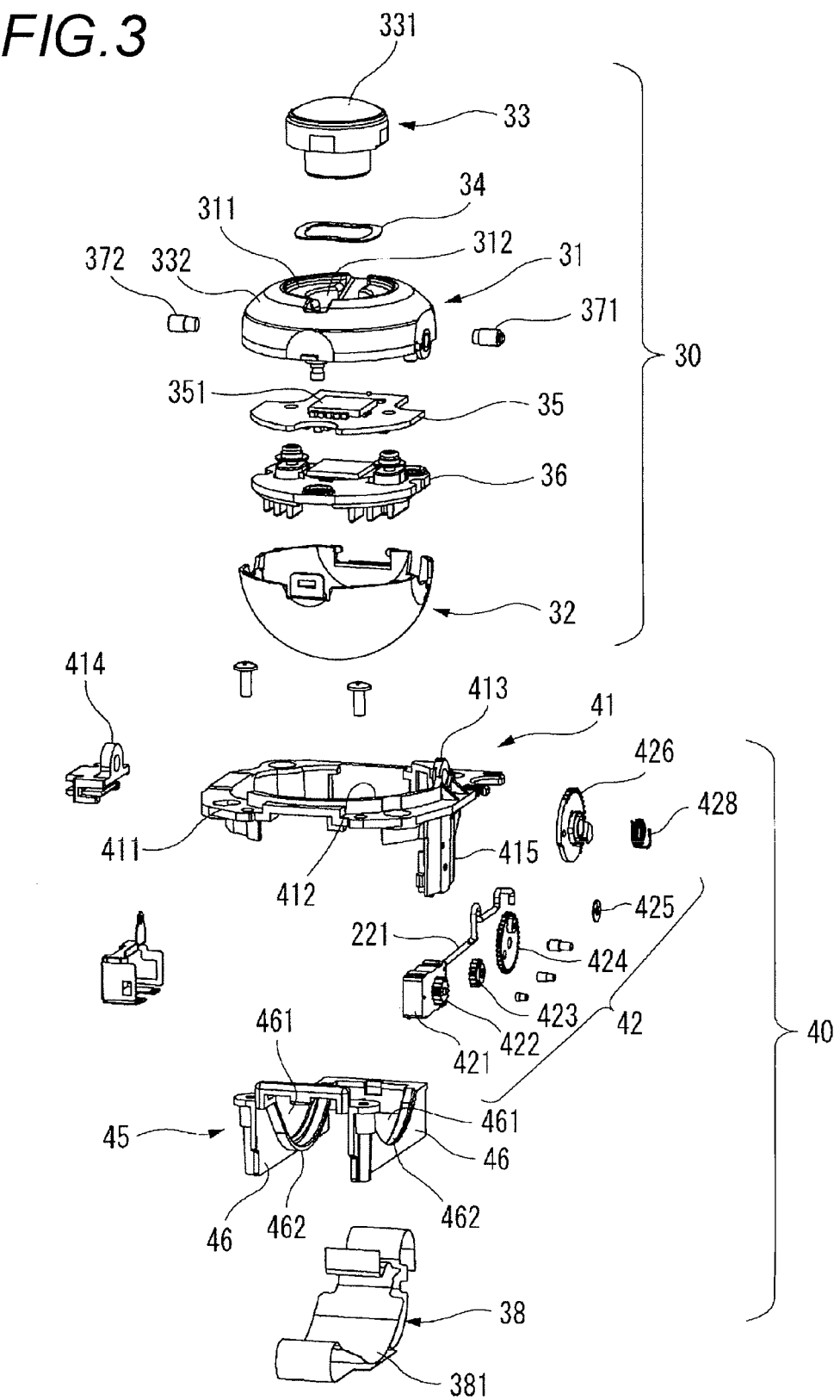
FIG. 3 is an exploded perspective view of the camera unit and the holding mechanism.

As illustrated in FIG. 3, the camera unit 30 has a disk-shaped front side frame 31 and a hemispherical rear side frame (behind portion) 32, thereby exhibiting a substantially hemispherical shape in its entirety.

Figure 8A:
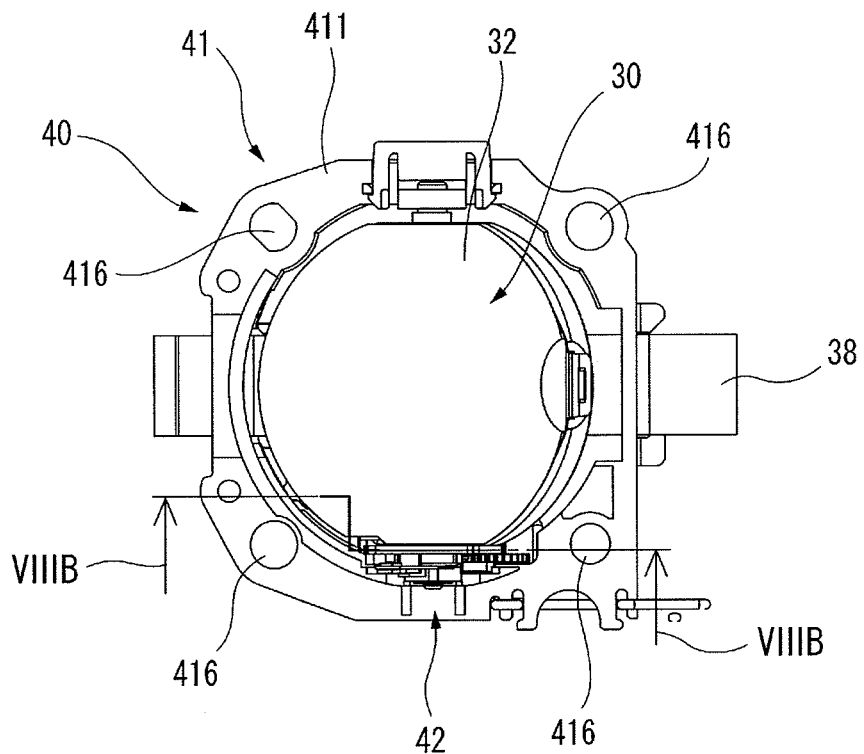
FIG. 8A is a plan view of the camera unit held in a non-imaging position.
Figure 8B:
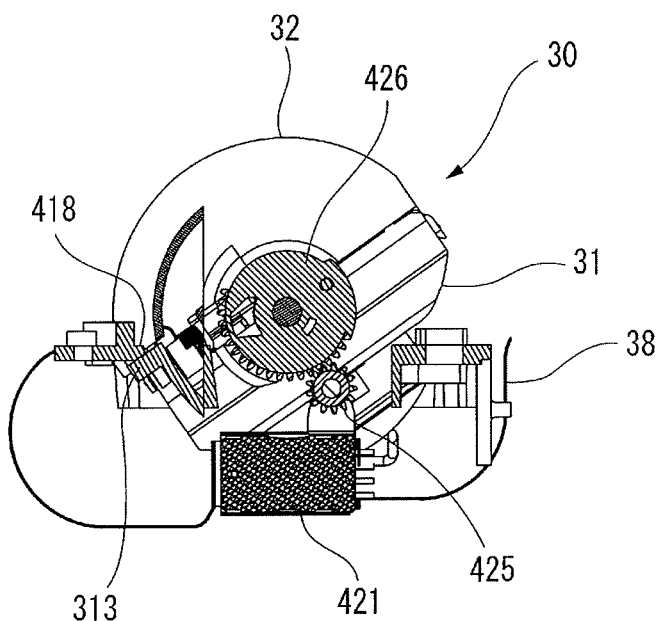
FIG. 8B is a cross-sectional view taken along VIIIB-VIIIB line indicated in FIG. 8A.

A pair of rotating shafts 371 and 372 are fixed to the front side frame 31 so as to intersect a normal direction of the front side frame 31. A recess portion 311 is provided on a front surface (upper surface in FIG. 3) of the front side frame 31, and an opening 312 is provided in the center of the recess portion 311. A camera lens 33 having a T-shape in its entirety is attached to the recess portion 311 and the opening 312 of the front side frame 31 through a wave washer 34 with a spring property. A cross-sectional L-shaped stopper 313 protruding into the rear side frame 32 is provided in the front side frame 31 (refer to FIGS. 5B, 5C and 8B).

The camera lens 33 images a wide range (for example, 115 degrees or more) using a fisheye lens without moving the camera unit 30. Otherwise, even though not illustrated, when not using the fisheye lens, the camera lens 33 may be rotated in a pan direction or a tilt direction to image the wide range.

A periphery portion 332 on the front surface of the front side frame 31 has a low reflection color such as black which is different from the color of the surface of the cover 70 and the auxiliary cover 72, for example. In addition, the camera lens 33 also has the low reflection color such as black.

Meanwhile, the rear side frame 32 has a substantially hemispherical shape of which the surface has a color different from that of the periphery portion 332 on the front surface of the front side frame 31, and a color similar to that of the front surface of the cover 70, for example, white and the like.

A camera circuit board 35 with an imaging device 351 mounted thereon is provided in an inner space formed by the front side frame 31 and the rear side frame 32. The imaging device 351 is positioned in the rear of the camera lens 33 and converts incoming light (incident light) which passes through the camera lens 33 into an electrical signal.

The camera circuit board 35 is attached to the middle of the front side frame 31 and the rear side frame 32 through an attachment plate 36. In addition, the camera circuit board 35 is electrically connected to the circuit board 22 by a flexible base plate 38. A wide portion 381 (refer to FIG. 13B) is formed in an intermediate position of the flexible base plate 38 in a longitudinal direction.

Figure 9:
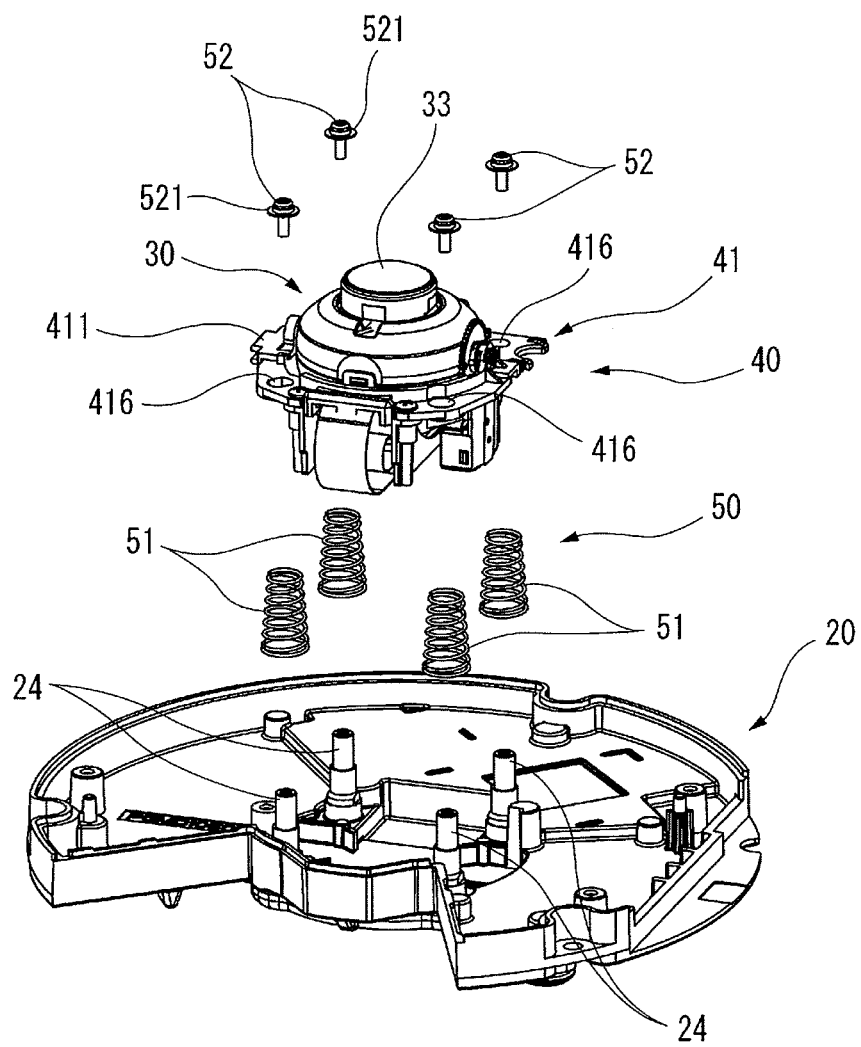
FIG. 9 is an exploded perspective view of the camera unit to be attached to the body through a shrinking mechanism.

As illustrated in FIG. 2A, the camera unit 30 is attached to the body 20 through a holding mechanism 40. As illustrated in FIGS. 2A and 9, the holding mechanism 40 has an upper frame 41 which is attached to the body 20 through a below-described shrinking mechanism (impact absorption mechanism) 50, and a lower frame 45 which is attached to a lower side of the upper frame 41.

Figure 4:
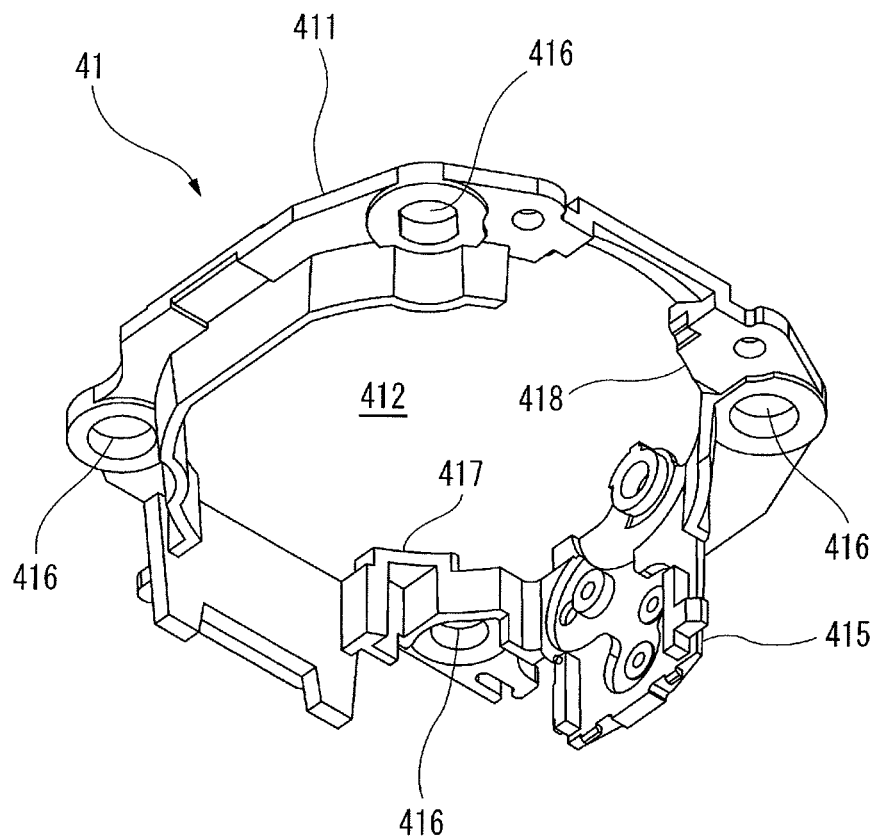
FIG. 4 is a perspective view of an upper frame viewed from below.

As illustrated in FIGS. 3 and 4, the upper frame 41 has a flange portion 411 with a substantially square shape in its entirety and has a circular opening portion 412 in the center of the flange portion 411 accommodating the camera unit 30. A side of the opening portion 412 of the flange portion 411 is configured to have a normal rotating stopper 417 which causes the camera unit 30 to be positioned in an imaging position, and a reverse rotating stopper 418 which causes the camera unit 30 to be positioned in a non-imaging position. In addition, a gear attachment portion 415 is attached to a lower side of the flange portion 411.

In addition, the lower frame 45 has a pair of standing walls 46 and 46 facing each other. Upper end portions of the standing walls 46 are provided with recess portions 461 which are arc-shaped downward, and have guide portions 462 which are inwardly bent along the recess portions 461. A gap between the guide portions 462 provided in the pair of standing walls 46 and 46 facing each other is set to be greater than a width d2 of a general portion 382 in the flexible base plate 38, and narrower than a width d1 of the wide portion 381 in the flexible base plate 38 (refer to FIG. 13B). The flexible base plate 38 is arranged on a lower side of the guide portion 462 between the pair of standing walls 46 and 46 (refer to FIG. 13A).

The flange portion 411 of the upper frame 41 is provided with a pair of bearings 413 and 414 in positions diagonally facing each other. The bearing 413 rotatably holds the rotating shaft 371 of the camera unit 30, and the bearing 414 rotatably holds the rotating shaft 372. Accordingly, the camera unit 30 is rotatably held by the holding mechanism 40.

The camera unit 30 is rotatably driven by a drive unit 42 provided in the upper frame 41. The drive unit 42 has a drive motor 421, and the drive motor 421 is connected to a power supply device and the like of the circuit board 22 (refer to FIG. 2B) by a connection cable 221 (refer to FIG. 3).

As illustrated in FIGS. 5A to 5C and 6, a drive gear 422 is attached to a drive shaft of the drive motor 421. A first idle gear 423 engages with the drive gear 422, and a second idle gear 424 engages with the first idle gear 423.

Figure 5A:
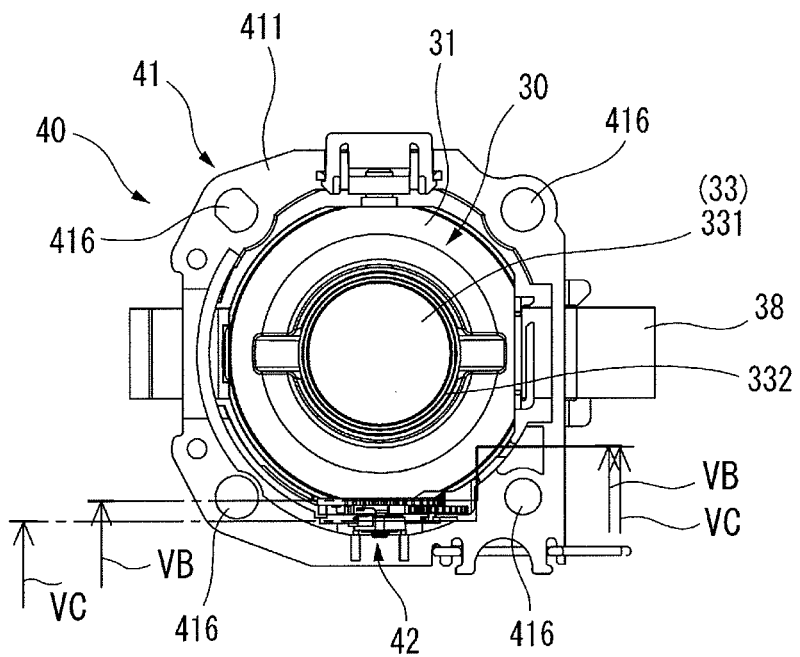
FIG. 5A is a plan view of the camera unit held in an imaging position.
Figure 5B:
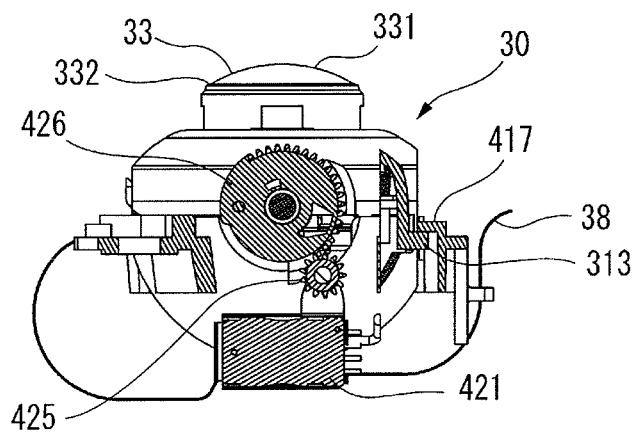
FIG. 5B is a cross-sectional view taken along VB-VB line indicated in FIG. 5A.
Figure 5C:
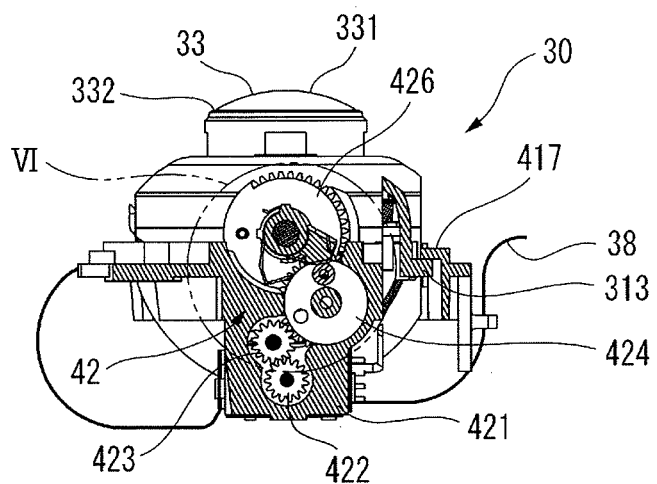
FIG. 5C is a cross-sectional view taken along VC-VC line indicated in FIG. 5A.

As illustrated in FIG. 5B, a third idle gear 425 with a small diameter is integrally attached to a rear surface of the second idle gear 424. The third idle gear 425 engages with a driven gear 426 which is fixed to the rotating shaft 371.

Figure 6:
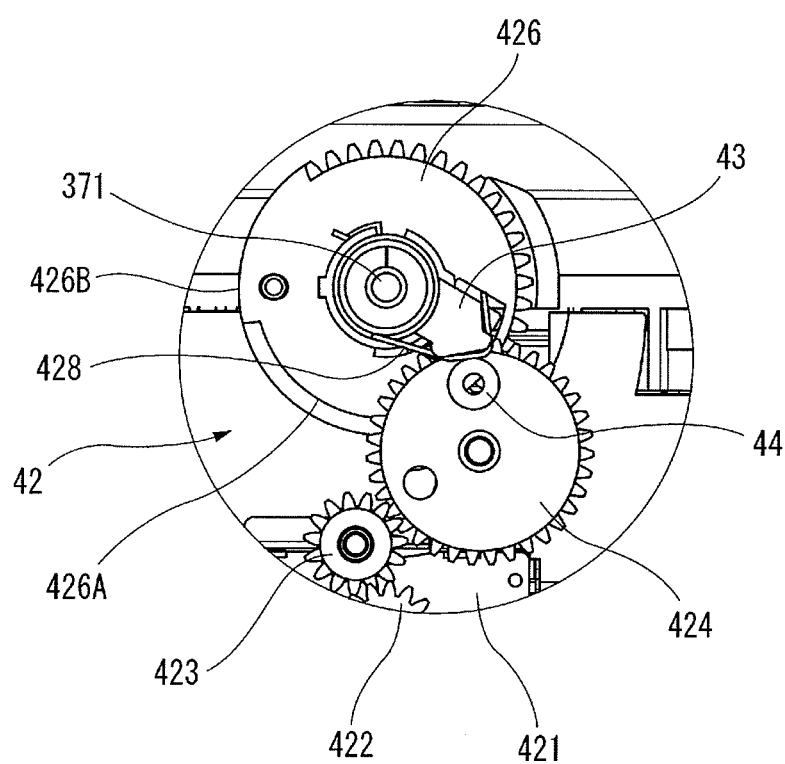
FIG. 6 is an enlarged view of the part VI indicated in FIG. 5C.

As illustrated in FIG. 6, the driven gear 426 is a chipped tooth gear having a tooth-chipped portion 426A from which teeth are chipped off and an outer diameter portion 426B on which no teeth are formed, and integrally attached to the rotating shaft 371. If the driven gear 426 rotates in accordance with the rotating of the third idle gear 425, the stopper 313 of the front side frame 31 of the camera unit 30 abuts on the normal rotating stopper 417 of the upper frame 41. In this state, the camera unit 30 faces directly upward and reaches the imaging position.

A restraint arm 43 is attached to the driven gear 426 and rotates integrally. In addition, a columnar stopper 44 is provided in the second idle gear 424. A torsion spring (otherwise, torsion coil spring) 428 is attached to the rotating shaft 371. The torsion spring 428 is fixed to the rotating shaft 371 or the driven gear 426, and an end of the torsion spring 428 slightly protrudes toward the lower side of the restraint arm 43.

Therefore, if the driven gear 426 rotates by a certain angle, the stopper 313 of the front side frame 31 abuts on the stopper 417 of the upper frame 41. Thereafter, the end of the torsion spring 428 abuts on the stopper 44 of the second idle gear 424, thereby positioning the camera unit 30 in the imaging position.

Figure 7A:
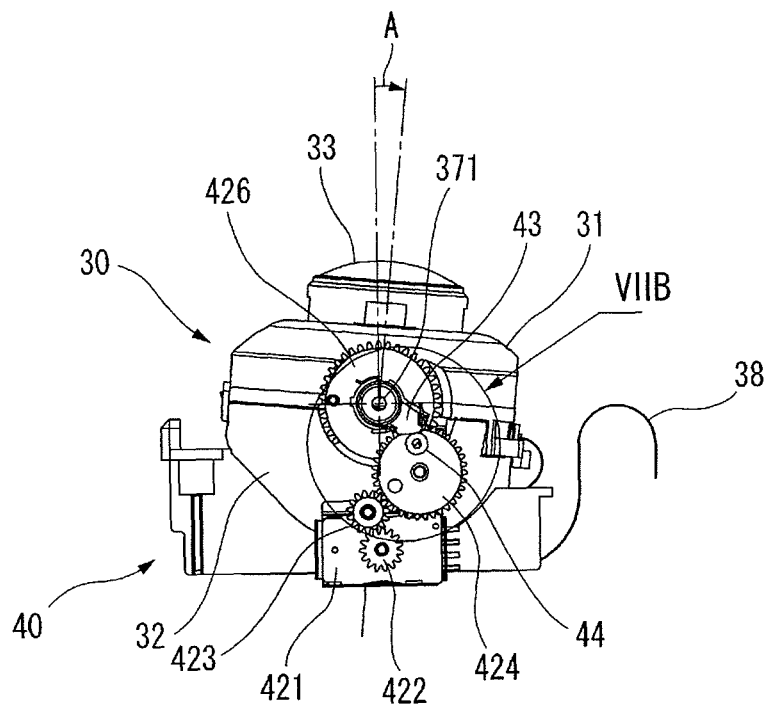
FIG. 7A is a front view of the camera unit rotated to be deviated from the imaging position.
Figure 7B:
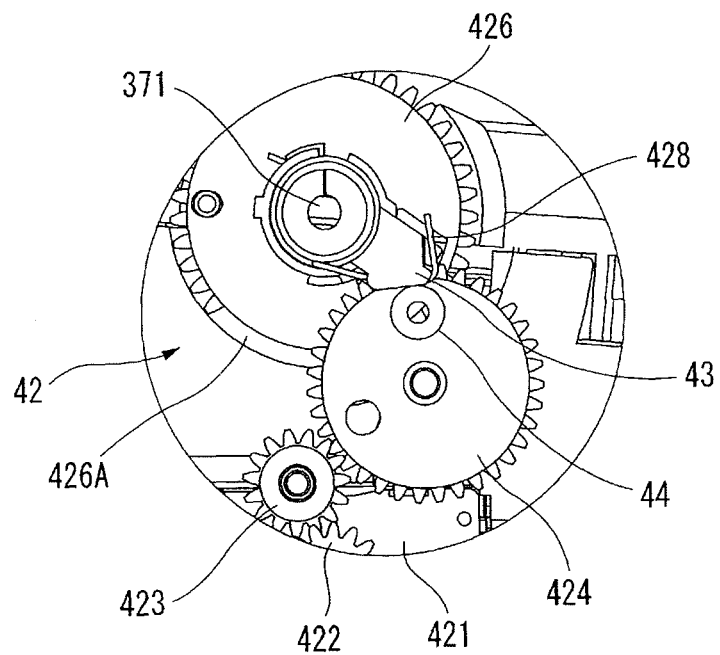
FIG. 7B is an enlarged view of the part VIIB indicated in FIG. 7A.

If the camera unit 30 is in the imaging position facing directly upward, the restraint arm 43 of the driven gear 426 does not abut on the stopper 44 of the second idle gear 424 yet. In this case, if an external force is further applied in a direction (arrow A direction illustrated in FIG. 7A) in which the camera unit 30 is rotated as illustrated in FIG. 7A, the end of the torsion spring 428 is elastically deformed as illustrated in FIG. 7B, and thus, the restraint arm 43 abuts on the stopper 44. During the period before abutting thereon, the camera unit 30 is held by a certain constant force. The restraint arm 43 and the stopper 44 configure a rotating-blocking portion which blocks the rotating of the camera unit 30.

Accordingly, even when the external force is applied to the camera unit 30 in a rotating direction in the imaging position, it is possible to maintain a posture of the camera unit 30 by a constant force. Furthermore, it is possible to protect the camera unit 30 and the holding mechanism 40 together with the below-described shrinking mechanism 50.

As illustrated in FIG. 9, the camera unit 30 is held by the shrinking mechanism 50. In other word, coil springs 51 are respectively inserted through four of substantially columnar attachment bases 24 standing on the upper surface of the body 20 to be attached thereto, and the flange portion 411 of the upper frame 41 of the holding mechanism 40 is attached onto the coil springs 51 using screws 52.

Four through holes 416 are provided in four corners of the flange portion 411. An inner diameter of the through hole 416 is greater than an outer diameter of the attachment base 24 so that the attachment base 24 can pass through the through hole 416. In addition, the inner diameter of the through hole 416 is smaller than the outer diameter of an upper end of the coil spring 51, and thus, it is not possible for the coil spring 51 to pass through the through hole 416.

In addition, a washer portion 521 is provided in the screw 52. An outer diameter of the washer portion 521 is greater than an inner diameter of the through hole 416 of the flange portion 411, and thus, it is not possible for the screw 52 to pass through the through hole 416.

Figure 10A:
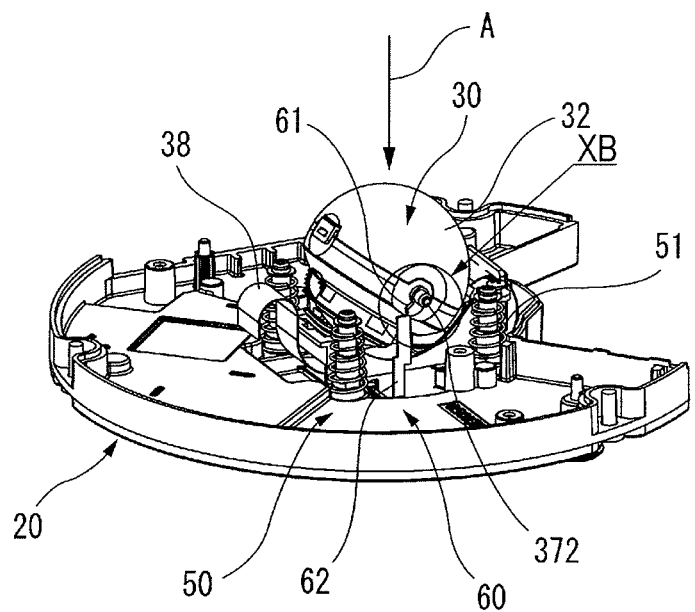
FIG. 10A is a perspective view illustrating a state of the camera unit in the non-imaging position before being pushed into the body.

As illustrated in FIG. 10A, a rotating mechanism 60 which causes the camera unit 30 to return to the imaging position is provided in the rotating shaft 372 on a side opposite to the side (refer to FIG. 5) where the drive unit 42 is provided in the camera unit 30. The rotating mechanism 60 has a return cam 61 and a guide plate 62.

The return cam 61 has a curved cam surface 611. The guide plate 62 stands in the vicinity of the rotating shaft 372 of the camera unit 30 on the upper surface of the body 20, for example, exhibiting a crank shape. The shape of the guide plate 62 may be a rod-shaped member, without being limited thereto.

Figure 10B:
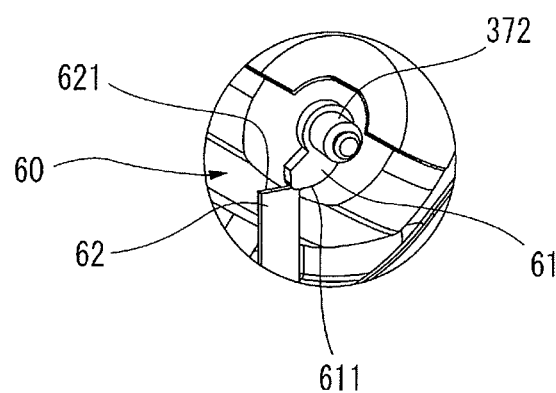
FIG. 10B is an enlarged view of the part XB indicated in FIG. 10A.

FIGS. 10A and 10B illustrate a state where the camera unit 30 is not pushed into the body in the non-imaging position where the camera unit 30 is reversed and the camera lens 33 faces the body 20 side. In other words, the camera unit 30 is pushed up by the coil springs 51, thereby positioning on upper ends of the attachment bases 24. In this state, the return cam 61 is stretched downward so that a tip of the cam surface 611 abuts on an upper end surface 621 of the guide plate 62.

Next, an operation of the camera apparatus 10 according to the present embodiment will be described.

Firstly, a rotating operation between the non-imaging position and the imaging position of the camera unit 30 will be described.

Figure 12C:
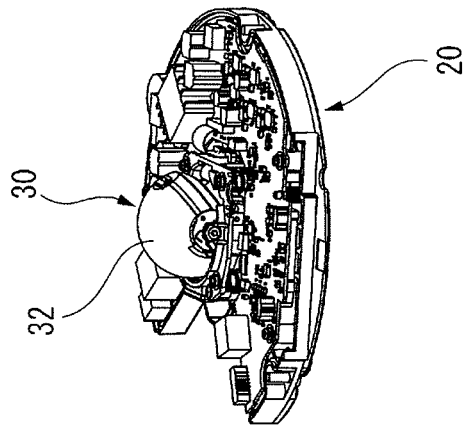
FIG. 12C is a perspective view illustrating the camera unit in the non-imaging position.
Figure 12B:
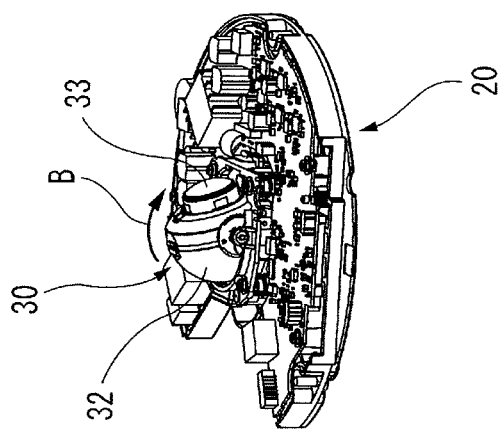
FIG. 12B is a perspective view illustrating the camera unit in the middle of rotating.
Figure 12A:
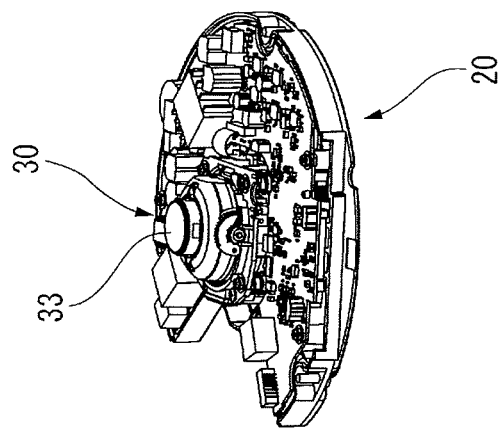
FIG. 12A is a perspective view illustrating the camera unit in the imaging position.

In FIG. 12A, the camera unit 30 is in the imaging position. When the drive motor 421 is rotated in this state, a rotational shaft of the drive motor 421 rotates the drive gear 422 (refer to FIG. 6). The drive gear 422 rotates the second idle gear 424 through the first idle gear 423. Since the third idle gear 425 is integrally provided with the second idle gear 424, the third idle gear 425 rotates along with the second idle gear 424. Since the driven gear 426 engages with the third idle gear 425, when the driven gear 426 rotates, the rotating shaft 371 is rotated.

FIG. 12B illustrates the camera unit 30 in the middle of rotating. The camera unit 30 is rotating in the arrow B direction indicated in FIG. 12B.

When the drive motor 421 is further rotated, the camera unit 30 is substantially reversed as illustrated in FIG. 12C. Therefore, the camera lens 33 faces the body 20 side (refer to FIGS. 8A and 8B), and the rear side frame 32 of the camera unit 30 is exposed to the outside from the opening 71 of the cover 70 (refer to FIG. 1). When rotating the camera unit 30 from the non-imaging position to the imaging position, the drive motor 421 is rotated reversely.

Next, an operation of the camera apparatus 10 in the present embodiment will be described with reference to FIG. 14.

Figure 14:
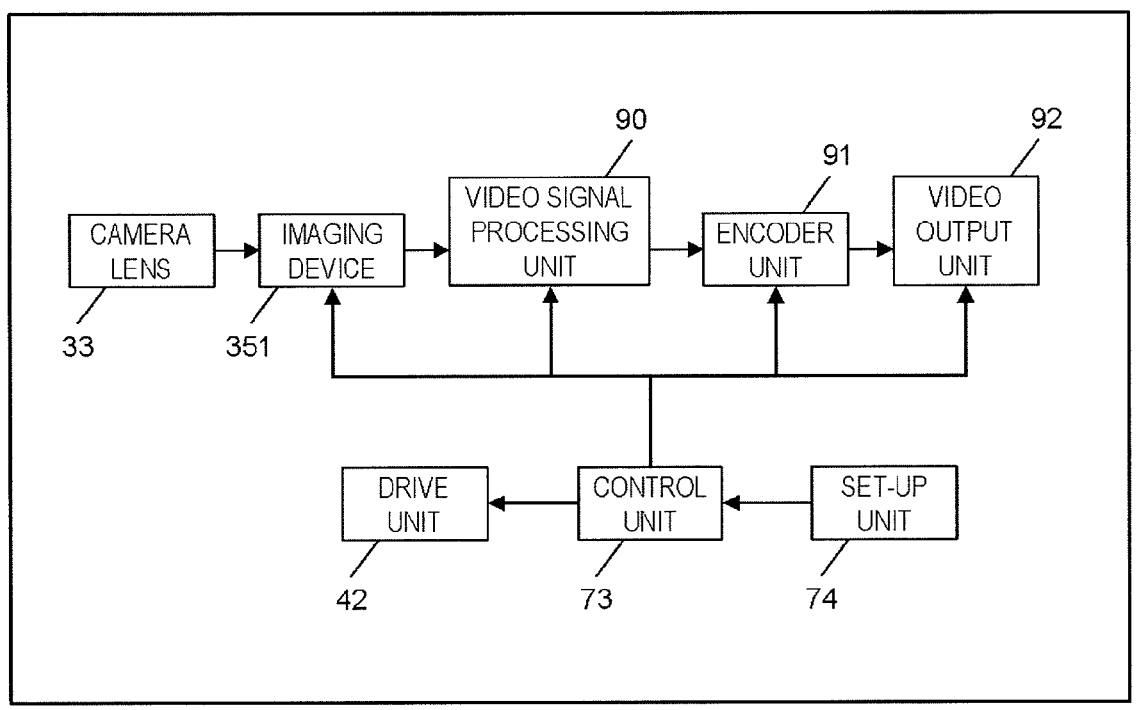
FIG. 14 is a block diagram showing an inner configuration of the camera apparatus according to the present embodiment.

FIG. 14 is a block diagram showing the camera apparatus 10 in the present embodiment.

The camera apparatus 10 according to the present embodiment includes the camera lens 33, the imaging device 351, the drive unit 42, a video signal processing unit 90, an encoder unit 91, a video output unit 92, a control unit 73 and a set-up unit 74.

The camera lens 33, for example, of which a horizontal angle of view is 180 degrees as the fisheye lens and images a circular monitoring region of the entire surroundings. The imaging device 351 receives light from the camera lens 33 and converts the light into an electrical signal, thereby outputting the electrical signal to the video signal processing unit 90 as a video signal.

The video signal processing unit 90 performs processing such as correcting a distortion of the video signal output from the imaging device 351, clipping out a portion from an image of the entire surroundings to output, or clipping out four portions to output to four screens.

The encoder unit 91 compresses the video signal received from the video signal processing unit 90 and converts the same into a digital signal. The video output unit 92 outputs the video signal compressed by the encoder unit 91 to the outside via a network. The camera lens 33 of the camera apparatus 10 according to the embodiment, may adopt a mechanism which is rotatable together with the imaging device 351 using a zoom lens, instead of using the fisheye lens. In addition, an analog signal may be output as it is without adopting the encoder unit 57.

The control unit 73 controls the drive unit 42, the imaging device 351, the video signal processing unit 90, the encoder unit 91 and the video output unit 92. The set-up unit 74 receives a signal from outside so as to allow a user to control from outside, thereby reflecting the same in the controlling of the control unit 73 for each processing unit.

Next, an outline of a camera system 80 using the camera apparatus 10 in the present embodiment will be described with reference to FIG. 15.

Figure 15:
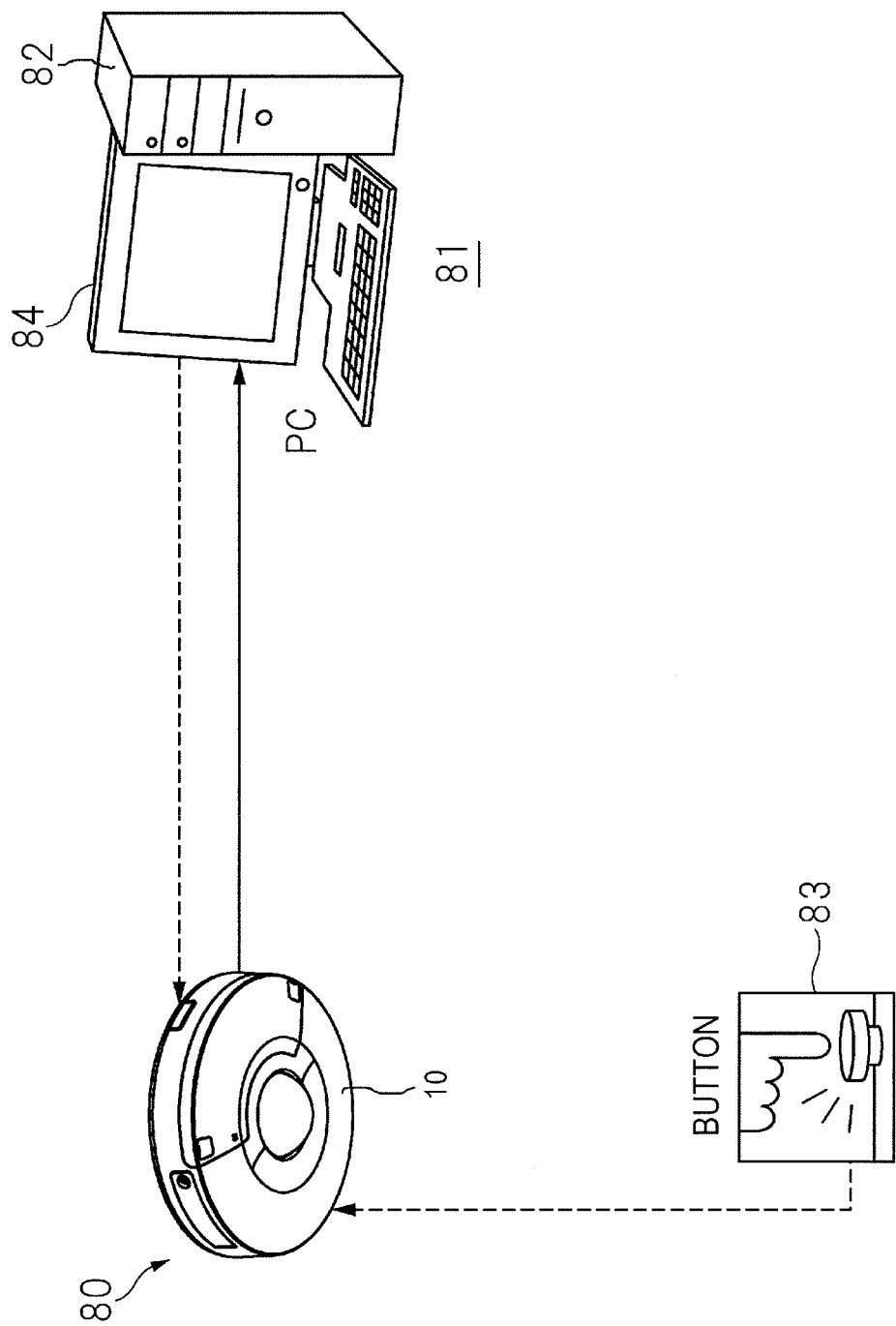
FIG. 15 is a schematic view of a camera system using the camera apparatus according to the present embodiment.

FIG. 15 is a schematic view of the camera system 80 using the camera apparatus 10 in the present embodiment.

The camera system 80 according to the present embodiment is installed in the camera apparatus 10, a monitoring room 81 and the like. The camera system 80 is provided with a PC 82 which monitors video from the camera apparatus 10, and a button 83 which is pressed in an emergency by the user. Generally, in the camera apparatus 10, for the sake of privacy protection, the camera lens 33 faces the body side, and the rear side frame 32 of the camera unit 30 is disposed in the vicinity of an inner side of the dome cover 75, thereby being in the non-imaging state. While in the non-imaging state, the video signal processing unit 90 does not output the video signal from the imaging device 351 but outputs a black screen image. The video signal from the imaging device 351 is not output so as not to display video, in which the inside of the camera apparatus 10 itself is imaged, on a monitor.

In addition, when in an emergency, for example, if the user presses the button 83, an emergency signal is transmitted through a network (not illustrated, wired network or wireless network, for example) and input to the control unit 73 of the camera apparatus 10. If the emergency signal is input to the control unit 73, the control unit 73 rotates the camera unit 30 and exposes the camera lens 33 from the opening 71 of the cover 70. In this manner, it is possible to image video of the monitoring region by moving the camera lens 33 to the imaging position. The video of the monitoring region is transmitted to the PC 82, thereby allowing a security man in the monitoring room 81 to watch the video of the monitoring region through a display monitor 84 and to understand the situation of the monitoring region when in an emergency.

When the emergency situation is settled, in order to return to the non-imaging state again, a signal to cancel the emergency situation is transmitted to the camera apparatus 10 from the PC 82 installed in the monitoring room 81. The control unit 73 of the camera apparatus 10, after receiving the signal to cancel the emergency situation, rotates the camera unit 30 toward the inside of the cover 70, thereby storing the camera unit 30 in the cover 70. Otherwise, a timer may be provided in the camera unit 30 to store the camera unit 30 in the cover 70 after a predetermined time elapsed.

In addition, when in the non-imaging state, the cover 70 and the rear side frame 32 are in a similar color, white. Meanwhile, when in the imaging state, the camera lens 33 and the periphery portion 332 of the front side frame 31 are in the low reflection color such as black which is different from the color of surface of the cover 70. Therefore, when the rear side frame 32 faces downward (non-imaging state) in state of being attached to the ceiling as in FIG. 1, the rear side frame 32 of the camera unit 30 is disposed in the vicinity of the inner side of the dome cover 75, and thus, if a person looks at the camera apparatus 10, it is possible to see the white colored rear side frame over the dome cover 75. Meanwhile, when the camera lens 33 faces downward (imaging state), if a person looks closely at the installed camera apparatus 10, it is possible to see the black colored camera lens 33 and the front side frame 31 in a portion (center portion) of the white colored cover 70.

Therefore, if a person closely looks at the camera apparatus 10, it is possible to easily understand whether it is in the non-imaging state (privacy protection mode) or the imaging state. Particularly, when a camera is installed on the ceiling, since a person cannot easily approach, it is effective to make the imaging state easily understandable in this manner. In addition, since the rear side frame 32 of the camera unit 30 is in a substantially hemispherical shape, it is possible to be disposed in the vicinity of the inner side of the dome cover 75, and thus, it is possible to reduce the difficulty of obscuring a view due to reflection of fluorescent light to the dome cover 75.

Next, an operation in which the camera unit 30 in the non-imaging position is pushed into the camera body by the external force will be described.

As illustrated in FIG. 10A, the camera unit 30 is attached to the attachment base 24 of the body 20 to freely subside against a restoring force of the coil spring 51 by the shrinking mechanism 50. However, normally, that is, in a state where the camera unit 30 in the non-imaging position does not receive the external force, since the flange portion 411 of the holding mechanism 40 is positioned on the upper end of the attachment base 24 due to the restoring force of the coil spring 51, the camera unit 30 is disposed in the vicinity of the inner side of the dome cover 75.

Therefore, as indicated by the arrow A illustrated in FIG. 10A, if a person with bad intention strikes the dome cover 75 with a hammer or the like from outside so as to destroy the camera unit 30, the dome cover 75 deforms to be recessed inward. Even though the camera unit 30 is pushed into the inner side (downward) of the cover due to the deformation of the dome cover 75, the coil spring 51 contracts, and thus, it is possible to reduce impact to the camera unit 30. Then, when the deformation of the dome cover 75 is restored, the holding mechanism 40 returns to the upper end position of the attachment base 24 by the restoring force of the coil spring 51 so that the camera unit 30 returns to the vicinity of the inner side of the dome cover 75.

Figure 11A:
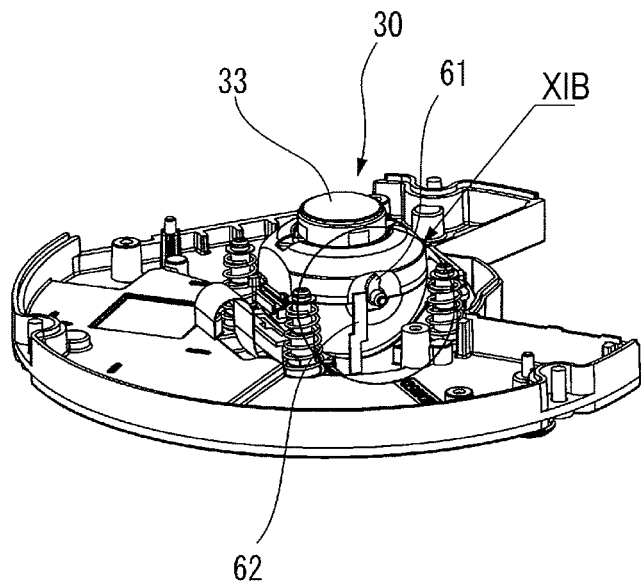
FIG. 11A is perspective view illustrating the camera unit pushed into the body.
Figure 11B:
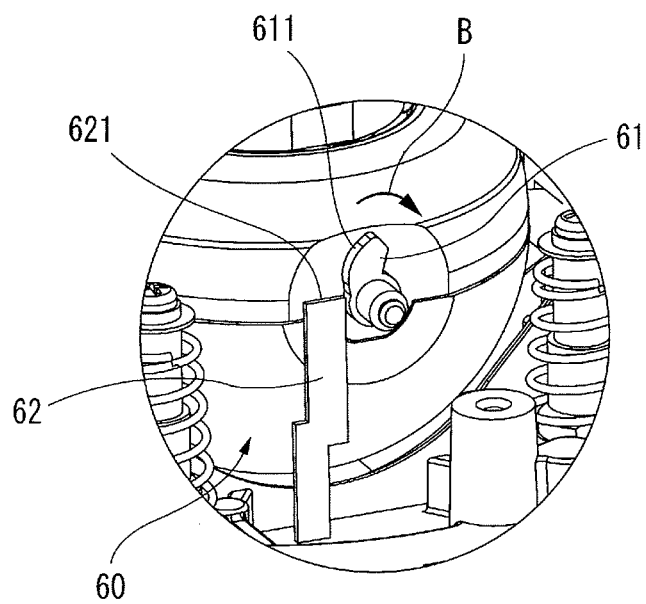
FIG. 11B is an enlarged view of the part XIB indicated in FIG. 11A.

In addition, if the camera unit 30 is pushed into the camera body from the non-imaging position illustrated in FIG. 10A, it is possible that the rotating mechanism 60 operates in connection with the shrinking mechanism 50 as well. If the camera unit 30 is pushed into the camera body, as illustrated in FIGS. 11A and 11B, with respect to the upper end surface 621 of the guide plate 62 with in a home position, the camera unit 30 subsides. Therefore, the cam surface 611 of the return cam 61 is pressed by the upper end surface 621 of the guide plate

62 on which the cam surface 611 abuts, thereby rotating the return cam 61 (arrow B direction indicated in FIG. 11B).

Accordingly, the camera unit 30 rotates and the camera lens 33 faces upward, the imaging direction. Then, if the external force pushing the camera unit 30 becomes weak, the camera lens 33 rises by the restoring force of the coil spring 51 in a state of facing the imaging direction, and thus, the camera unit 30 returns to the imaging position.

Therefore, in the non-imaging state, even if the camera apparatus 10 is struck from outside over the dome cover 75 by the hammer or the like, the camera unit 30 automatically rotates and returns to the imaging position to be in the imaging state, and thus, it is possible to image the person who tries to destroy the camera apparatus 10.

Next, operation effect of the camera apparatus 10 according to the present embodiment will be described.

The camera unit 30 is stored in the body 20 which is attached to the ceiling surface 11, and the dome cover 75 is exposed from the opening 71 of the cover 70. The camera unit 30 has the camera lens 33. The camera unit 30 including the camera lens 33 is held by the body 20 so as to be rotatable, and for example, in response to the emergency signal, rotates from the imaging position to the non-imaging position which cannot be seen from the imaging target region. In other words, the camera unit 30 is switched from the first state in which the camera lens 33 is accommodated inside the body 20 to the second state in which the camera lens 33 is exposed to the outside through the rotating of the camera unit 30 by the rotating mechanism 60 in accordance with the emergency signal generated by the pressing operation of the user. Therefore, according to the camera apparatus 10, when the camera lens 33 is in the state of being rotated to the non-imaging position, since the camera lens 33 cannot be seen from the imaging target region, without providing a member to hide the camera lens 33, it is possible to make a person visually recognize that they are not imaged by the camera unit 30.

In addition, since the periphery portion 332 of the camera lens 33 is the low reflection color, it is possible to prevent the periphery portion 332 from reflecting and improve the image quality.

In addition, the fisheye lens is adopted as the camera lens 33, and thus, it is possible to image the wide range even in a state where the camera unit 30 is fixed.

In addition, since the first state and the second state differ in color of a part of the camera unit 30 which is exposed to the outside of the body 20, for example, the periphery portion 332 of the camera lens 33 is different from the cover 70 in color, it is possible to easily and visually recognize that the camera lens 33 is in the imaging position, thereby having an effect of crime prevention.

In addition, when the camera lens 33 of the camera unit 30 is rotated to a position which cannot be seen from the imaging target region, the rear side frame 32 on the opposite side of the camera lens 33 is positioned on the surface of the cover 70. In this case, since the rear side frame 32 and the surface of the cover 70 are in a similar color, it is possible to easily and visually recognize that the camera lens 33 is not in the imaging position.

In addition, since the holding mechanism 40 holds the camera unit 30 in the imaging position, it is possible to easily position the camera unit 30 in the imaging position and reliably perform imaging.

In addition, in the holding mechanism 40, the drive unit 42 rotates the camera unit 30 which is rotatably held by the rotating shafts 371 and 372. In addition, since the holding mechanism 40 has the restraint arm 43 and the stopper 44 as an example of a rotating restraint portion which blocks the rotating of the camera unit 30, it is possible to prevent the camera unit 30 from rotating more than a predetermined angle.

In addition, since the camera unit 30 is held by the shrinking mechanism (impact absorption mechanism) 50, when the camera unit 30 is struck by the hammer or the like, the camera unit 30 subsides. In this manner, the impact is absorbed, and thus, it is possible to prevent the camera unit 30 from being destroyed.

In addition, since there is included the rotating mechanism 60 which rotates the camera unit 30 to the imaging position in accordance with the imaging position return operation of the shrinking mechanism 50, if the camera unit 30 is pressed by the hammer or the like or rotated by force, the camera unit 30 returns to the imaging position. Accordingly, it is possible to prevent mischief and reliably perform imaging in the imaging direction. In addition, it is possible to image the scene of the mischief.

Figure 13A:
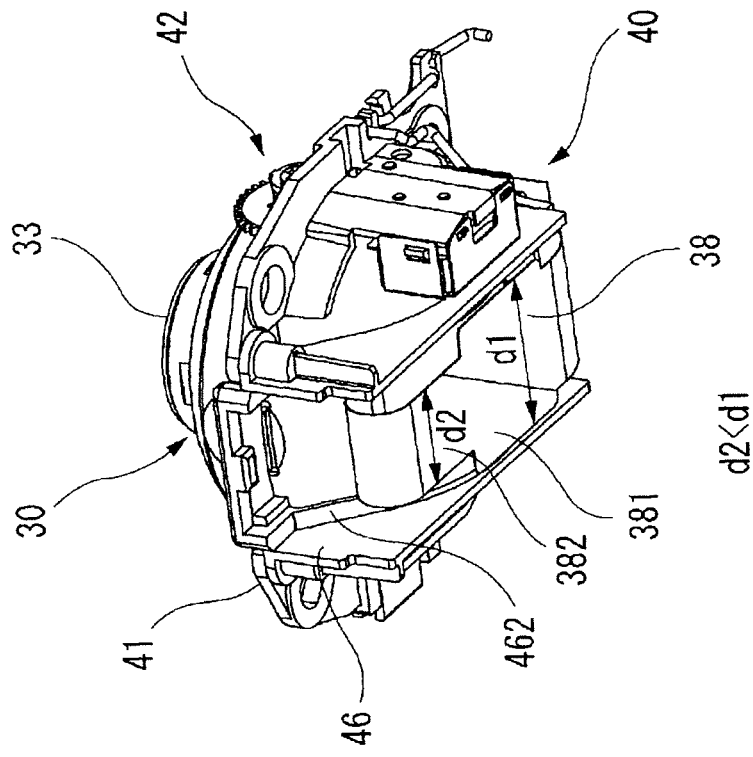
FIG. 13A is a perspective view of the camera unit which is held by the holding mechanism in the imaging position, viewed from above.
Figure 13B:
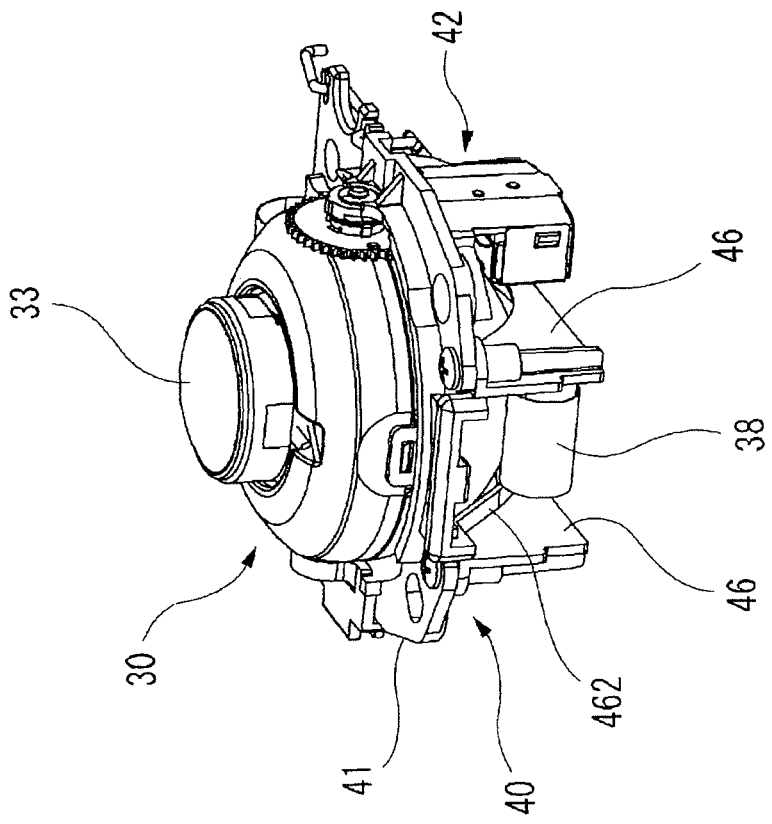
FIG. 13B is a perspective view of the camera unit which is held by the holding mechanism in the imaging position, viewed from below.

Furthermore, as illustrated in FIG. 13A and 13B, in the camera apparatus 10 according to the present embodiment, there is provided the wide portion 381 in a portion of the flexible base plate 38 which is connected to the camera unit 30. The wide portion 381 is greater than a substantial gap between the guide portions 462 of the standing walls 46 which cause the camera unit 30 to be rotatably held by the body 20. Therefore, it is possible to prevent the flexible base plate 38 from being caught when the camera unit 30 rotates by arranging the flexible base plate 38 in the outer side (lower side) of the guide portions 462. According to this, the camera unit 30 can smoothly rotate.

In addition, since the rear side frame 32 of the camera unit 30 has the substantially hemispherical shape, it is possible to be disposed in the vicinity of the inner side of the dome cover 75 and reduce the difficulty of obscured view due to the reflection of fluorescent light to the dome cover 75.

In addition, since there is provided the transparent dome cover 75, and the rear side frame 32 is disposed in the vicinity of the inner side of the dome cover 75 in the first state, it is possible to make human beings visually recognize that imaging by the camera apparatus 10 is not performed if the camera unit 30 is in the state of being rotated to the non-imaging position.

The camera apparatus according to the present invention is not limited to the above-described embodiment, and appropriate changes, modifications and the like can be made.

In an aspect of the present disclosure, a camera apparatus includes: a camera unit that is provided with a camera lens; a camera body that rotatably holds the camera unit; and a rotating mechanism that rotates the camera unit in response to an emergency signal so as to be switched from a first state where the camera lens is stored inside the camera body to a second state where the camera lens is exposed to an outside of the camera body.

The camera apparatus may be configured so that the first state and the second state differ in color of a part of the camera unit which is exposed to the outside of the camera body.

The camera apparatus may be configured so that the camera lens is a fisheye lens.

The camera apparatus may be configured by including a holding mechanism that holds the camera unit in an imaging position, wherein the holding mechanism includes a rotating shaft rotatably holding the camera unit, a drive unit that rotates the camera unit about the rotating shaft, and a rotating-blocking portion that blocks the camera unit from rotating.

The camera apparatus may be configured by further including an impact absorption mechanism, wherein the camera unit is held by the impact absorption mechanism.

The camera apparatus may be configured so that the rotating mechanism rotates and returns the camera unit in the imaging position in accordance with a returning force applied from the impact absorption mechanism.

The camera apparatus may be configured so that a wide portion abutting on a frame which rotatably holds the camera unit is provided in a portion of a flexible base plate connected to the camera unit.

The camera apparatus may be configured so that a rear side frame of the camera unit has a hemispherical shape.

The camera apparatus may be configured by further including a transparent dome cover having an inner side, wherein the rear side frame of the camera unit is disposed in a vicinity of the inner side of the dome cover in the first state.

The present application is based on and claims the benefit of

Japanese patent application No. 2013-079609 filed on Apr. 5, 2013, the contents of which are incorporated by reference in its entirety.

What is claimed is:

1. A camera apparatus comprising:
   a camera unit that is provided with a camera lens;
   a camera body that rotatably holds the camera unit;
   a camera cover that encloses, together with the camera body, the camera unit, and that includes a shape-restorable predetermined portion through which the camera unit photographs a subject outside of the camera cover; and
   a rotating mechanism that rotates the camera unit, in response to an emergency signal, from a non-imaging position, in which the camera lens is oriented away from the predetermined portion, to an imaging position, in which the camera lens is oriented to an outside of the camera cover through the predetermined portion.

2. The camera apparatus according to claim 1, wherein
   a portion of the camera unit visible from outside of the camera cover in the non-imaging position and a portion of the camera unit visible from outside of the camera cover in the imaging position differ in color.

3. The camera apparatus according to claim 1, wherein the camera lens is a fisheye lens.

4. The camera apparatus according to claim 1, further comprising:
   a holding mechanism that holds the camera unit in the imaging position, wherein
   the holding mechanism includes a rotating shaft rotatably holding the camera unit, a driver that rotates the camera unit about the rotating shaft, and a stopper that prevents the camera unit from rotating.

5. The camera apparatus according to claim 4, further comprising:
   a first stopper that rotates together with the camera unit rotated by the driver; and
   a second stopper that abuts on the first stopper when the first stopper rotates by a predetermined degree,
   wherein the stopper comprises:
      a restraint arm that rotates together with the camera unit rotated by the driver; and
      a third stopper that abuts on the restraint arm when the camera unit is further rotated from a position where the second stopper abuts on the first stopper.

6. The camera apparatus according to claim 1, further comprising:
   an impact absorption mechanism that supports the camera unit.

7. The camera apparatus according to claim 6, wherein
   the rotating mechanism rotates the camera unit to move from the non-imaging position to the imaging position in accordance with a return force applied by the impact absorption mechanism.

8. The camera apparatus according to claim 1, further comprising
   a flexible base plate connected to the camera unit, the flexible base plate comprising a wide portion that abuts on a frame rotatably supporting the camera unit.

9. The camera apparatus according to claim 1, wherein
   the camera unit includes a hemispherical rear side frame provided opposite to the camera lens.

10. The camera apparatus according to claim 9, wherein
    the predetermined portion of the camera cover comprising a transparent dome cover, and
    the rear side frame of the camera unit is disposed substantially inside the dome cover in the non-imaging position.

11. The camera apparatus according to claim 1, wherein a portion of the camera unit other than the camera lens is visible from the outside through the predetermined portion of the camera cover in the non-imaging position.

12. The camera apparatus according to claim 1, wherein the camera cover is not movable with respect to the camera body.

13. The camera apparatus according to claim 1, wherein the shape-restorable predetermined portion returns to an undeformed shape upon removal of a shape-deforming force.

14. A camera apparatus comprising:
    a camera unit that is provided with a camera lens;
    a camera body that rotatably holds the camera unit;
    an impact absorption mechanism that supports the camera unit;
    a camera cover that encloses, together with the camera body, the camera unit, and that includes a predetermined portion through which the camera unit photographs a subject outside of the camera cover; and
    a rotating mechanism that rotates the camera unit, in response to an emergency signal, from a non-imaging position, in which the camera lens is oriented away from the predetermined portion, to an imaging position, in which the camera lens is oriented to an outside of the camera cover through the predetermined portion,
    wherein the rotating mechanism rotates the camera unit to move from the non-imaging position to the imaging position in accordance with a return force applied by the impact absorption mechanism.

15. A camera apparatus comprising:
    a camera unit that is provided with a camera lens;
    a camera body that rotatably holds the camera unit;
    a camera cover that encloses, together with the camera body, the camera unit, and that includes a predetermined portion through which the camera unit photographs a subject outside of the camera cover;
    a rotating mechanism that rotates the camera unit, in response to an emergency signal, from a non-imaging position, in which the camera lens is oriented away from the predetermined portion, to an imaging position, in which the camera lens is oriented to an outside of the camera cover through the predetermined portion; and
    a flexible base plate connected to the camera unit, the flexible base plate comprising a wide portion that abuts on a frame rotatably supporting the camera unit.

* * * * *